(12) United States Patent
Kim et al.

(10) Patent No.: US 10,257,829 B2
(45) Date of Patent: *Apr. 9, 2019

(54) METHOD AND APPARATUS FOR SUPPORTING MULTIPLE FREQUENCY BANDS IN MOBILE COMMUNICATION SYSTEM

(71) Applicant: Samsung Electronics Co., Ltd., Suwon-si, Gyeonggi-do (KR)

(72) Inventors: Sangbum Kim, Suwon-si (KR); Soenghun Kim, Yongin-si (KR); Gert-Jan Van Lieshout, Staines (GB); Himke Van Der Velde, Zwolle (NL); Kyeongin Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/658,674

(22) Filed: Mar. 16, 2015

(65) Prior Publication Data

US 2015/0189657 A1 Jul. 2, 2015

Related U.S. Application Data

(63) Continuation of application No. 14/242,456, filed on Apr. 1, 2014, now Pat. No. 8,982,830, which is a
(Continued)

(30) Foreign Application Priority Data

Aug. 9, 2012 (KR) .................. 10-2012-0087076

(51) Int. Cl.
  *H04W 72/04* (2009.01)
  *H04W 48/10* (2009.01)
  (Continued)

(52) U.S. Cl.
  CPC ......... *H04W 72/0453* (2013.01); *H04L 5/003* (2013.01); *H04W 48/10* (2013.01); *H04W 72/0413* (2013.01); *H04W 48/20* (2013.01)

(58) Field of Classification Search
  CPC ......... H04W 72/0453; H04W 72/0413; H04W 48/10; H04W 48/20; H04W 72/0406;
  (Continued)

(56) References Cited

U.S. PATENT DOCUMENTS 6,370,390 B1 4/2002 Salin et al.
8,203,987 B2 6/2012 Ishii et al.
(Continued)

FOREIGN PATENT DOCUMENTS

CN 1229562 A 9/1999
CN 101682896 A 3/2010
(Continued)

OTHER PUBLICATIONS

Ericsson et al., "Multiple frequency band indicators per cell" 3GPP Draft; R2-114299 Multiple FBI.3rd Generation Partnership Project (3GPP), Mobile Competence Centre; 650 Route Des Lucioles; F-06921 Sophia-Anti Polis Cedex; France, vol. RAN WG2, No. Athens, Greece; Aug. 22, 2011, Aug. 16, 2011, pp. 1/5-5/5, XP050540038.
(Continued)

*Primary Examiner* — Kwang B Yao
*Assistant Examiner* — Ricardo H Castaneyra
(74) *Attorney, Agent, or Firm* — Jefferson IP Law, LLP

(57) ABSTRACT

A method and an apparatus for supporting multiple frequency bands efficiently in a mobile communication system are provided. The method includes generating first system information including a frequency band indicator indicating a frequency band supported by the base station and an additional frequency band indicator indicating at least one frequency band supported by the base station, and broadcasting the first system information.

20 Claims, 8 Drawing Sheets

Related U.S. Application Data continuation of application No. 13/589,729, filed on Aug. 20, 2012, now Pat. No. 8,706,164.

(60) Provisional application No. 61/526,223, filed on Aug. 22, 2011, provisional application No. 61/531,185, filed on Sep. 6, 2011, provisional application No. 61/595,646, filed on Feb. 6, 2012, provisional application No. 61/612,950, filed on Mar. 19, 2012, provisional application No. 61/649,910, filed on May 21, 2012, provisional application No. 61/653,026, filed on May 30, 2012.

(51) Int. Cl.
*H04L 5/00* (2006.01)
*H04W 48/20* (2009.01)

(58) Field of Classification Search
CPC .... H04W 72/042; H04W 24/02; H04L 5/003; H04L 5/001
See application file for complete search history.

(56) References Cited

U.S. PATENT DOCUMENTS

| | | | |
|---|---|---|---|
| 8,638,705 B2 | 1/2014 | Park et al. | |
| 8,649,288 B2 | 2/2014 | He et al. | |
| 8,792,417 B2 | 7/2014 | Yeoum et al. | |
| 9,237,419 B2 | 1/2016 | Jung et al. | |
| 2004/0180675 A1 | 9/2004 | Choi et al. | |
| 2006/0281466 A1 | 12/2006 | Gholmieh et al. | |
| 2007/0268877 A1 | 11/2007 | Buckley et al. | |
| 2009/0034452 A1 | 2/2009 | Somasundaram et al. | |
| 2009/0054055 A1 | 2/2009 | Iwamura et al. | |
| 2009/0170498 A1 | 7/2009 | Venkatasubramanian et al. | |
| 2009/0221289 A1 | 9/2009 | Xu et al. | |
| 2009/0232118 A1 | 9/2009 | Wang et al. | |
| 2009/0238098 A1 | 9/2009 | Cai et al. | |
| 2009/0239525 A1 | 9/2009 | Cai et al. | |
| 2009/0323608 A1* | 12/2009 | Adachi | H04W 48/18 370/329 |
| 2010/0093386 A1 | 4/2010 | Damnjanovic et al. | |
| 2010/0118805 A1* | 5/2010 | Ishii | H04W 52/367 370/329 |
| 2010/0135159 A1 | 6/2010 | Chun et al. | |
| 2010/0144361 A1* | 6/2010 | Gholmieh | H04W 72/0453 455/450 |
| 2010/0177831 A1 | 7/2010 | Kim et al. | |
| 2010/0195643 A1 | 8/2010 | Kodali et al. | |
| 2010/0296467 A1 | 11/2010 | Pelletier et al. | |
| 2010/0317356 A1* | 12/2010 | Roessel | H04W 72/0406 455/450 |
| 2010/0322217 A1 | 12/2010 | Jin et al. | |
| 2011/0002284 A1 | 1/2011 | Talwar et al. | |
| 2011/0003603 A1 | 1/2011 | Park et al. | |
| 2011/0038277 A1 | 2/2011 | Hu et al. | |
| 2011/0051609 A1 | 3/2011 | Ishii et al. | |
| 2011/0092217 A1 | 4/2011 | Kim et al. | |
| 2011/0103328 A1 | 5/2011 | Lee et al. | |
| 2011/0158165 A1 | 6/2011 | Dwyer et al. | |
| 2011/0170503 A1 | 7/2011 | Chun et al. | |
| 2011/0194505 A1 | 8/2011 | Faccin et al. | |
| 2011/0195668 A1 | 8/2011 | Lee et al. | |
| 2011/0201307 A1 | 8/2011 | Segura | |
| 2011/0249641 A1 | 10/2011 | Kwon et al. | |
| 2011/0281578 A1 | 11/2011 | Narsimha et al. | |
| 2011/0299415 A1 | 12/2011 | He et al. | |
| 2012/0020231 A1 | 1/2012 | Chen et al. | |
| 2012/0044898 A1 | 2/2012 | Ishii | |
| 2012/0051297 A1 | 3/2012 | Lee et al. | |
| 2012/0092286 A1 | 4/2012 | O'Prey et al. | |
| 2012/0108199 A1 | 5/2012 | Wang et al. | |
| 2012/0120821 A1 | 5/2012 | Kazmi et al. | |
| 2012/0176950 A1 | 7/2012 | Zhang et al. | |
| 2012/0314640 A1 | 12/2012 | Kim et al. | |
| 2013/0070682 A1 | 3/2013 | Kim et al. | |
| 2013/0088980 A1 | 4/2013 | Kim et al. | |
| 2013/0265866 A1 | 10/2013 | Yi et al. | |
| 2014/0023032 A1 | 1/2014 | Kim et al. | |
| 2014/0056246 A1 | 2/2014 | Chun et al. | |
| 2014/0220982 A1 | 8/2014 | Jung et al. | |
| 2014/0242974 A1 | 8/2014 | Lee et al. | |
| 2017/0195020 A1 | 7/2017 | Ko et al. | |

FOREIGN PATENT DOCUMENTS

| | | |
|---|---|---|
| CN | 101772928 A | 7/2010 |
| CN | 101841889 A | 9/2010 |
| CN | 102027798 A | 4/2011 |
| CN | 102098655 A | 6/2011 |
| CN | 102170644 A | 8/2011 |
| EP | 0946071 A2 | 9/1999 |
| EP | 2 265 077 A1 | 12/2010 |
| EP | 2 469 939 A1 | 6/2012 |
| GB | 2461780 A | 1/2010 |
| JP | 2011-78019 A | 4/2011 |
| JP | 2013-520917 A | 6/2013 |
| JP | 2013-135386 A | 7/2013 |
| KR | 10-2008-0089421 A | 10/2008 |
| KR | 10-2009-0086441 A | 8/2009 |
| KR | 10-2010-0108459 A | 10/2010 |
| KR | 10-2010-0126509 A | 12/2010 |
| KR | 10-2010-0133477 A | 12/2010 |
| KR | 10-2010-0135679 A | 12/2010 |
| KR | 10-2010-0137531 A | 12/2010 |
| KR | 10-2011-0000479 A | 1/2011 |
| KR | 10-2011-0000482 A | 1/2011 |
| KR | 10-2011-0090813 A | 8/2011 |
| KR | 10-2011-0091305 A | 8/2011 |
| KR | 10-2011-0093642 A | 8/2011 |
| KR | 10-2011-0109992 A | 10/2011 |
| RU | 2262811 C2 | 10/2005 |
| RU | 2 426 251 C2 | 12/2010 |
| RU | 2411697 C2 | 2/2011 |
| WO | 98/01004 A2 | 1/1998 |
| WO | 98/26625 A2 | 6/1998 |
| WO | 2008/137354 A1 | 11/2008 |
| WO | 2010-121662 A1 | 10/2010 |
| WO | 2010/124228 A2 | 10/2010 |
| WO | 2010/125969 A1 | 11/2010 |
| WO | 2011/038272 A1 | 3/2011 |
| WO | 2011038625 A1 | 4/2011 |
| WO | 2011/085802 A1 | 7/2011 |
| WO | 2011/093666 A2 | 8/2011 |
| WO | 2011/099725 A2 | 8/2011 |
| WO | 2011/100492 A1 | 8/2011 |
| WO | 2011-105856 A2 | 9/2011 |
| WO | 2011/154761 A1 | 12/2011 |
| WO | 2011/155784 A2 | 12/2011 |
| WO | 2011/157292 A1 | 12/2011 |
| WO | 2012/008691 A2 | 1/2012 |
| WO | 2012-021138 A1 | 2/2012 |
| WO | 2012-108811 A1 | 8/2012 |
| WO | 2012/108876 A1 | 8/2012 |
| WO | 2012/141483 A2 | 10/2012 |
| WO | 2013/005855 A1 | 1/2013 |
| WO | 2013/051836 A1 | 4/2013 |
| WO | 2013/051912 A2 | 4/2013 |
| WO | 2013/065995 A1 | 5/2013 |

OTHER PUBLICATIONS

Ericsson et al., "Multiple frequency band indicators per cell" 3GPP Draft; R2-114301 36.331 CR Multiple FBI, 3rd Generation Partnership Project (3GPP), Mobile Competence Centre; 650, Route Des Lucioles; France, 1-16 vol. RAN WG2, No. Athens. Greece; Aug. 22, 2011, Aug. 16, 2011, pp. 1-7, XP050540040.

Media Tek, Reporting Pcmax, 3GPP TSG-RAN WG2 Meeting #74 R2-113081, 3, May 9, 2011.

Inter Digital Communications PCMAX Inclusion for Inter-band PHR R2-116105, Nov. 18, 2011.

(56) References Cited

OTHER PUBLICATIONS

3GPP, 3rd Generation Partnership Project; Technical Specification Group Radio Access Network; Evolved Universal Terrestrial Radio Access (E-UTRA); Radio Resource Control (RRC); Protocol Specification (Release 10), 3GPP TS 36.331, Jun. 2011, V10.2.0, Sophia Antipolis, France.
Nokia Siemens Networks, General Considerations on New Carrier Types, 3GPP TSG RAN WG1 #68, Feb. 3-10, 2012, R1-120711, Dresden, Germany.
Huawei et al., The MDT Applicability of EPLMN, 3GPP TSG-WG2 Meeting #75, Aug. 22-26, 2011, R2-114011, Athens, Greece.
3GPP, 3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive Tests (MDT); Overall description; Stage 2 (Release 10), 3GPP TS 37.320, Sep. 2011, V10.4.0, Sophia Antipolis, France.
3GPP, 3rd Generation Partnership Project; Technical Specification Group Radio Access Network; Study on Minimization of Drive-Tests in Next Generation Networks; (Release 9), 3GPP TR 36.805, Sep. 2009, V9.0.0, Sophia Antipolis, France.
23.1 RRC Connection Establishment, Aug. 12, 2011, www.lte-bullets.com.
Alcatel-Lucent et al.; RRC signalling design for Almost Blank Subframe patterns; 3GPP TSG-RAN WG2 Meeting #72; R2-106451; Nov. 15-19, 2010; Jacksonville, FL.
Huawei et al; Consideration on DRX in eICIC scenario; 3GPP TSG-RAN WG2 Meeting #73; R2-111021; Feb. 21-25, 2011; Taipei.
Research in Motion UK Limited; UE power saving for eICIC; 3GPP TSG RAN WG2 Meeting #73; R2-111233; Feb. 21-25, 2011; Taipei, Taiwan.
3GPP; 3rd Generation Partnership Project; Technical Specification Group Radio Access Network Extending 850 MHz Study Item Technical Report (Release 9); 3GPP TR 37.806; V1.10.0; Aug. 2011.
Nokia Corporation et al., RACH and Carrier Aggregation, 3GPP TSG-RAN WG2 Meeting #68, Nov. 9-13, 2009, R2-096844, Jeju, South Korea.
Asustek, Issues of Random Access Procedure on SCell, 3GPP TSG-RAN WG2 Meeting #74, May 9-13, 2011, R2-112922, Barcelona, Spain.
Itri, Considerations on Random Access on SCell, 3GPP TSG RAN WG2 #74, May 9-13, 2011, R2-113192, Barcelona, Spain.
New Postcom, Consideration on RA Response Window Size for SCell, 3GPP TSG RAN WG2 Meeting #79, Aug. 13-17, 2012, R2-123485, Qingdao, China.
Huawei et al., Enabling SMS for PS-Only, SA WG2 Meeting #87, Oct. 10-14, 2011, 52-114586, Jeju, Korea.
3GPP, 3rd Generation Partnership Project; Technical Specification Group Services and System Aspects; Group Services and System Aspects; Circuit Switched (CS) fallback in Evolved Packet System (EPS); Stage 2 (Release 10), 3GPP TS 23.272, Sep. 2011, V10.5.0, Sophia Antipolis, France.
Alcatel-Lucent et al., RA Procedure on SCell, TSG-RAN WG2#77, Feb. 6-10, 2012, R2-120603, Dresden, Germany.
3GPP, 3rd Generation Partnership Project; Technical Specification Group Radio Access Network; Study on Minimization on drive-tests in Next Generation Networks (Release 9), 3GPP TR 36.805, Dec. 2009, V9.0.0, Sophia Antipolis, France.
3GPP, Evolved Universal Terrestrial Radio Access (E-UTRA); Study on Minimization of Drive-Tests in Next Generation Networks, 3GPP Specific Detail, http://www.3gpp.org/DynaReport/36805.htm.
Ericsson et al., Accessibility Measurements for MDT, 3GPP TSG-RAN WG2 #76, Oct. 14-18, 2011, Tdoc R2-116148, San Francisco, CA, USA.
Alcatel-Lucent, VLR SGs Paging Retry, SA WG2 Meeting #87, Oct. 10-14, 2011, S2-114636, Jeju, South Korea.

3GPP, 3rd Generation Partnership Project; Technical Specification Group Services and System Aspects; Service Accessibility (Release 11), 3GPP TS 22.011, Dec. 2011, V11.2.0, Sophia Antipolis, France.
Huawei et al., General Consideration of EAB in LTE, 3GPP TSG-RAN WG2 Meeting #75, Aug. 22-26, 2011, R2-113988, Athens, Greece.
Pantech, IDC Trigger Procedure, 3GPP TSG-RAN WG2 Meeting #77, R2-120664, Nov. 14-18, 2011, Dresden, Germany.
Motorola, Solution for Extra Low Power Consumption and Time Controlled, 3GPP TSG SA WG2 Meeting #78, Feb. 22-26, 2010, TD S2-101215, San Francisco, USA.
Interdigital Communications, Handling of SCell Activation/Deactivation RF Retuning Interruptions, 3GPP TSG RAN WG2 #78, May 21-25, 2012, R2-122289, Prague, Czech Republic.
Renasas Mobile Europe Ltd., Considerations on Returning Interruptions, 3GPP TSG-RAN WG4 Meeting #63, May 21-25, 2012, R4-123056, Prague, Czech Republic.
Ericsson et al., Extended Access Barring for MTC Devices, 3GPP TSG-RAN WG2 #74, May 9-13, 2011, R2-113030, Barcelona, Spain.
LG Electronics Inc., Further Discussion on EAB, 3GPP TSG-RAN WG2 #74, May 9-13, 2011, R2-113339, Barcelona, Spain.
3rd Generation Partnership Project; Technical Specification Group Services and System Aspects; Service Accessibility (Release 11), 3GPP TS 22.011, Jun. 2011, V11.0.0, Sophia Antipolis, France.
Japanese Decision to Decline the Amendment dated Apr. 4, 2017, issued in the Japanese Application No. 2014-524941.
Japanese Ruling of Refusal dated Dec. 26, 2016, issued in the Japanese Application No. 2014-524941.
Chinese Office Action dated Jun. 22, 2017, issued in the Chinese Application No. 201380018209.4.
Chinese Office Action dated Jun. 26, 2017, issued in the Chinese Application No. 201380016921.0.
Chinese Office Action dated Aug. 22, 2017, issued in the Chinese Application No. 201380038905.1.
Chinese Office Action dated Sep. 5, 2017, issued in the Chinese Application No. 201380024026.3.
LG Electronics Inc, FGI bit 25, 3GPP Draft, R2-113277 FGI Bit for Inter-Frequency Measurements and Reporting, 3rd Generation Partnership Project (3GPP), Mobile Competence Centre, 650, Route Des Lucioles, F-06921 Sophia-Antipolis Cedex, France, vol. RAN WG2, No. Barcelona, Spain; May 9, 2011, May 3, 2011, XP050495420.
3rd Generation Partnership Project; Technical Specification Group Radio Access Network; Evolved Universal Terrestrial Radio Access (E-UTRA); User Equipment (UE) radio transmission and reception (Release 10), 3GPP Standard; 3GPP TS 36.101, No. V10.3.0, Jun. 21, 2011, pp. 1-237, XP050553331.
European Search Report dated Mar. 14, 2018, issued in European Application No. 18157697.6-1231.
European Office Action dated Apr. 13, 2018, issued in European Application No. 12 826 373.8-1218.
Korean Office Action dated Feb. 2, 2018, issued in Korean Application No. 10-2012-0016971.
Catt, Corrections and Clarifications on UTRA related FGIS, 3GPP TSG-RAN WG2#77bis, R2-121551, Mar. 26-30, 2012, Jeju, Korea.
Catt, Corrections and Clarifications on UTRA related FGIs, 3GPP TSG-RAN WG2#77bis, R2-121549, Mar. 26-30, 2012, Jeju, Korea.
Catt, Analysis on FGIs for 3/4-mode UE, 3GPP TSG-RAN WG2#77bis, R2-121173, Mar. 26-30, 2012, Jeju, Korea.
Australian Office Action dated Jan. 10, 2018, issued in the Australian Patent Application No. 2017200065.
Japanese Office Action dated Dec. 25, 2017, issued in the Japanese Patent Application No. 2016-223589.
Russian Office Action dated Nov. 8, 2017, issued in the Russian Patent Application No. 2016139252.
Vodafone, "Rejection of Connections towards a congested CN Node for UMTS and LTE", 3GPP TSG-RAN WG3#69bis R3-102964, 3GPP, Oct. 12, 2010.
Interdigital, "RACH with Carrier Aggregation", 3GPP Draft, R2-102132 (RACH in CA), 3rd Generation Partnership Project (3GPP), Mobile Competence Centre; 650 , Route Des Lucioles, F-06921 Sophia-Antipolis Cedex, France, vol. RAN WG2, No. Beijing , China, Apr. 12, 2010, Apr. 6, 2010 (Apr. 6, 2010), XP050422566.

(56) References Cited

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 11)", 3GPP Standard; 3GPP TS 36.321, 3rd Generation Partnership Project (3GPP), Mobile Competence Centre; 650, Route Des Lucioles, F-06921 Sophia-Antipolis Cedex, France, vol. RAN WG2, No. V11.0.0, Sep. 21, 2012 (Sep. 21, 2012), pp. 1-55, XP050649832.

"3rd Generation Partnership Project; Technical Specification Group Radio Access Network; Evolved Universal Terrestrial Radio Access(E-UTRA);Medium Access Control (MAC) Protocol Specification (Release10)", TS36.321, V10.1.0, Mar. 2011.

Ericsson et al., "Multiple frequency band indicators per cell", 3GPP TSG-RAN WG2 #75, R2-114299, http://www.3gpp.org/ftp/tsg_ran/WG2_RL2/TSGR2_75/docs/R2-114299.zip, Aug. 26, 2011 (Aug. 26, 2011).

Ericsson et al., "Multiple frequency band indicators per cell", 3GPP TSG-RAN2 Meeting #75, R2-114301, http://www.3gpp.org/ftp/tsg_ran/WG2_RL2/TSGR2_75/docs/R2-114301.zip, Aug. 26, 2011 (Aug. 26, 2011).

Korean Office Action dated Jun. 15, 2018, issued in Korean Application No. 10-2012-0037390.

Korean Office Action dated Jun. 12, 2018, issued in Korean Application No. 10-2014-7024860.

Japanese Office Action dated Apr. 27, 2018, issued in Japanese Application No. 2017-074583.

Japanese Office Action dated Jun. 11, 2018, issued in Japanese Application No. 2017-111875.

Australian Office Action dated Jun. 5, 2018, issued in Australian Application No. 2017203059.

Canadian Office Action dated Jun. 7, 2018, issued in Canadian Application No. 2,845,779.

European Search Report dated Jun. 7, 2018, issued in European Application No. 18160008.1.

Vodafone, "Extended ACB for UTRAN", 3GPP TSG-RAN WG2#72 R2-106275, 3GPP, published on Nov. 11, 2010.

Itri, "Handling of Roaming MTC Devices for CN overload control", 3GPP TSG-RAN WG2#72bis R2-110399, 3GPP, published on Jan. 11, 2011.

Nec et al., "vSRVCC Enhancements in TS 24.301 excluding vSRVCC indicator (terminology variant 2)", 3GPP TSG-CT WG 1#72 C1-112670, 3GPP, published on Jul. 4, 2011.

Samsung: "Discussion on CQI/SRS transmission during DRX", 3GPP TSG-RAN2 #75 Meeting, R2-114180, XP050539989, published on Aug. 22, 2011.

Samsung, "PS-only high level function description", 3GPP TSG SA WG2 Meeting #89, S2-110485, published on Jan. 31, 2012.

European Office Action dated Jul. 24, 2018, issued in European Application No. 12 839 782.5-1214.

"Adaptation and Mobility in Wireless Information Systems", Randy H. Katz, IEEE Personal Communications, 1994.

Research in Motion Ltd: "Go to Long Sleep Command for LTE DRX", 3GPP Draft; R2-081868, 3rd Generation Partnership Project (3GPP), Mobile Competence Centre; 650, Route Des Lucioles; F-06921 Sophia-Antipolis Cedex; France, XP050139558, dated Mar. 25, 2008.

Lte: "E-UTRA; MAC Protocol Specification (3GPP TS 36.321 Version 10.2.0 Release 10)", ETSI TS 136 321 V10.2.0., pp. 34-35,41-44, XP055319954. Dated Jun. 28, 2011.

Motorola Mobility: "Reference and Synchronisation Signals in Additional Carrier Type", 3GPP Draft; R1-120515—Additional Carrier Types_RS Sync, 3rd Generation Partnership Project (3GPP), Mobile Competence Centre; 650, Route Des Lucioles; F-06921 Sophia-Antipolis Cedex; France, vol. RAN WGI, No. Dresden, Germany; XP050563331. Dated Feb. 2, 2002.

New Postcom: "Considerations on measurement for additional carrier types", 3GPP Draft; R1-113701_Considerations on Measurement for Additional Carrier Types, 3rd Generation Partnership Project (3GPP), Mobile Competence Centre; 650, Route Des Lucioles; F-06921 Sophia-Antipolis Cedex; France, vol. RAN WGI, No. San Francisco, USA; XP050562373. Dated Nov. 10, 2011.

Vancouver. et al., "Support for Enhanced UE Battery Saving", SA WG2 Meeting #89 S2-120715, Dated Jan. 31, 2012.

Ericsson, ST-Ericsson, Huawei, Hisilicon, Alcatel-Lucent, Verizon Wireless, Nokia Siemens Networks, SMS over SGs usage to support NAS procedures for PS only SMS, 3GPP TSG-SA WG2#89 S2-121108, 3GPP, Dated Feb. 10, 2011.

Huawei, HiSilicon, Enabling SMS for PS-only, 3GPP TSG-SA WG2#87 S2-114186, 3GPP, Dated Oct. 4, 2011.

Extended European Search Reports dated Nov. 19, 2018, issued in the European Application No. 18186199.8-1218.

Extended European Search Reports dated Nov. 26, 2018, issued in the European Application No. 18192775.7-1218.

Indian Office Action dated Nov. 27, 2018, issued in the Indian Application No. 2519/KOLNP/2014.

Korean Intellectual Property Decision to Grant dated Dec. 12, 2018, issued in the Korean Application No. 10-2012-0037390.

Korean Intellectual Property Office Action dated Dec. 15, 2018, issued in the Korean Application No. 10-2014-7028047.

Korean Intellectual Property Office Action dated Dec. 20, 2018, issued in the Korean Application No. 10-2013-0012964.

Japanese Office Action dated Dec. 17, 2018, issued in the Japanese Application No. 2018-073713.

Korean Intellectual Property Office Action dated Jan. 21, 2019, issued in Korean Application No. 10-2014-7027400.

LG Electronics Inc., R2-114456, EAB model in UE, 3GPP TSG RAN WG2 #75. Athens, Greece, Aug. 22-26, 2011.

* cited by examiner

METHOD AND APPARATUS FOR SUPPORTING MULTIPLE FREQUENCY BANDS IN MOBILE COMMUNICATION SYSTEM

CROSS-REFERENCE TO RELATED APPLICATIONS

This is a continuation application of prior application Ser. No. 14/242,456, filed Apr. 1, 2014, which issued as U.S. Pat. No. 8,982,830 on Mar. 17, 2015; which is a continuation of U.S. patent application Ser. No. 13/589,729, filed on Aug. 20, 2012, which issued as U.S. Pat. No. 8,706,164 on Apr. 22, 2014; which claims the benefit under 35 U.S.C. § 119(e) of a U.S. Provisional applications Nos. 61/526,223 filed on Aug. 22, 2011, 61/531,185 filed on Sep. 6, 2011, 61/595,646 filed on Feb. 6, 2012, 61/612,950 filed on Mar. 19, 2012, 61/649,910 filed on May 21, 2012, and 61/653,026 filed on May 30, 2012 in the U.S. Patent and Trademark Office, and under 35 U.S.C. § 119(a) of a Korean patent application No. 10-2012-0087076 filed on Aug. 9, 2012 in the Korean Intellectual Property Office, the entire disclosures of each of which are hereby incorporated by reference.

BACKGROUND OF THE INVENTION

1. Field of the Invention

The present invention relates to a mobile communication system. More particularly, the present invention relates to a method and apparatus for supporting multiple frequency bands efficiently in a mobile communication system.

2. Description of the Related Art

Mobile communication systems were developed to provide subscribers with voice communication services while on the move. With the advancement of communications technologies, the mobile communication systems have evolved to support high speed data communication services as well as the standard voice communication services. Recently, as one of the next generation mobile communication systems, Long Term Evolution Advanced (LTE-A) is being standardized by the 3rd Generation Partnership Project (3GPP). LTE-A is a technology designed to provide high speed packet-based communication of up to 100 Mbps.

Several schemes for LTE-A are being discussed including one scheme for reducing the number of nodes located in a communication path by simplifying a configuration of the network, and another scheme for maximally approximating wireless protocols to wireless channels.

Meanwhile, unlike voice service, a data service is provided on a resource determined according to an amount of data to be transmitted and channel conditions. Accordingly, the wireless communication system, especially for cellular communication, is provided with a scheduler that manages transmission resource allocation in consideration of a needed resource amount, channel conditions, amount of data, etc. This is the case with the LTE-A system as the next generation mobile communication system, and in this case the scheduler is located at a base station and manages the transmission resource allocation.

In LTE-A Release-11, a new frequency band that overlaps a legacy frequency band is added. Although the frequency bands are used in different areas, a roaming terminal should be capable of operating on both of the overlapped frequency bands.

Therefore, a need exists for a technique for supporting a roaming terminal that is capable of operating on both of the overlapped frequency bands.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide a method and for supporting multiple frequency bands efficiently in a mobile communication system Another aspect of the present invention is to provide a method and apparatus for informing a terminal of multiple frequency bands and determining a center frequency of an uplink frequency band, an uplink transmission power, and center frequencies of downlink bands of neighbor cells in a mobile communication system supporting multiple frequency bands.

In accordance with an aspect of the present invention, a method for supporting multiple frequency bands at a base station in a mobile communication system is provided. The method includes generating first system information including a frequency band indicator indicating a frequency band supported by the base station and an additional frequency band indicator indicating at least one frequency band supported by the base station, and broadcasting the first system information.

In accordance with another aspect of the present invention, a method for supporting multiple frequency bands at a terminal in a mobile communication system is provided. The method includes receiving a first system information including a frequency band indicator indicating a frequency band supported by a base station and an additional frequency band indicator indicating at least one frequency band supported by the base station, determining whether the frequency bands indicated by the frequency band indicator and the additional frequency band indicator includes one or more frequency bands supported by the terminal, and attempting, when the frequency bands indicated by the frequency band indicator and the additional frequency band indicator includes the one or more frequency bands supported by the terminal, access to the base station.

In accordance with another aspect of the present invention, a base station supporting a plurality of frequency bands in a mobile communication system is provided. The base station includes a transceiver which transmits and receives signals to and from a terminal, and a controller which controls generating a first system information including a frequency band indicator indicating a frequency band supported by the base station and an additional frequency band indicator indicating at least one frequency band supported by the base station and broadcasting the first system information.

In accordance with still another aspect of the present invention, a terminal for supporting a plurality of frequency bands in a mobile communication system is provided. The terminal includes a transceiver which transmits and receives signals to and from a base station, and a controller which controls receiving a first system information including a frequency band indicator indicating a frequency band supported by a base station and an additional frequency band indicator indicating at least one frequency band supported by the base station, determining whether the frequency bands indicated by the frequency band indicator and the additional frequency band indicator includes one or more frequency bands supported by the terminal, and attempting, when the frequency bands indicated by the frequency band indicator and the additional frequency band indicator includes the one or more frequency bands supported by the terminal, access to the base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method and apparatus for supporting multiple frequency bands efficiently in a mobile communication system. The present disclosure proposes a method for informing a terminal of multiple frequency bands and determining a center frequency of an uplink frequency band, an uplink transmission power, and center frequencies of downlink bands of neighbor cells in a mobile communication system supporting multiple frequency bands.

Figure 1:
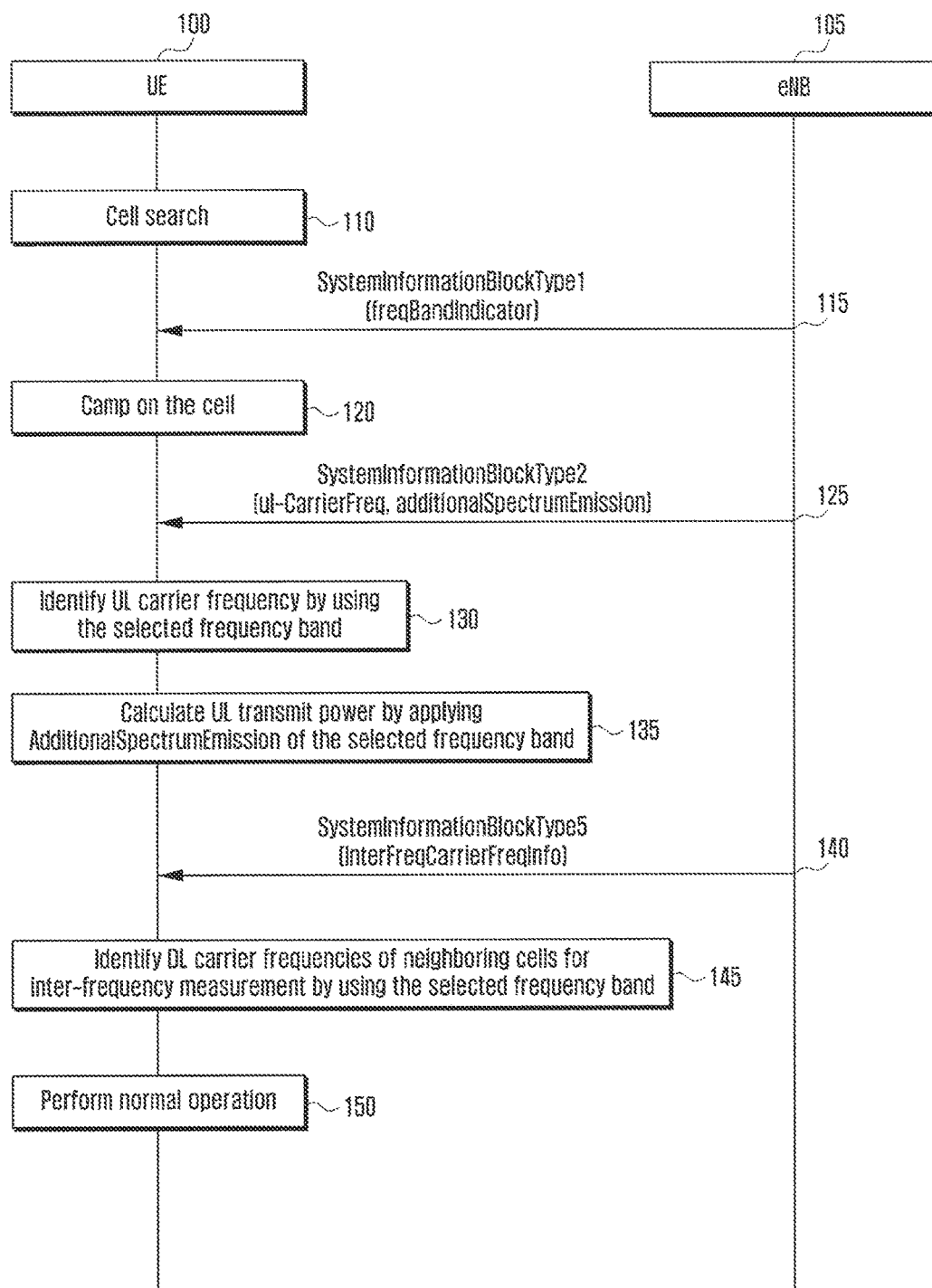
FIG. 1 is a signaling diagram illustrating a procedure for notifying a User Equipment (UE) of a frequency band and determining an uplink center frequency, an uplink transmission power, and downlink center frequencies of neighbor cells in a Long Term Evolution (LTE) system according to an exemplary embodiment of the present invention.

Prior to the explanation of the exemplary embodiments of the present invention, a brief description is made of the method for informing a User Equipment (UE) of the frequency band and determining uplink center frequency, uplink transmission power, and center frequencies of neighbor cells in the legacy Long Term Evolution (LTE) technology with reference to FIG. 1.

FIG. 1 is a signaling diagram illustrating a procedure for notifying a UE of a frequency band and determining an uplink center frequency, an uplink transmission power, and downlink center frequencies of neighbor cells in an LTE system according to an exemplary embodiment of the present invention.

Referring to FIG. 1, the UE 100 performs cell searching to discover a cell to camp on at step 110. Afterward, if the UE 100 is to establish a connection, the UE 100 makes a request to the cell to which it has camped for service.

If a cell having an appropriate signal strength is found, the UE 100 receives SystemInformationBlockType1 (SIB1) (hereinafter, interchangeably recited with the term 'first system information') broadcast by an evolved Node B (eNB) 105 of the corresponding cell at step 115. The SIB1 includes a freqBandIndicator Information Element (IE) (hereinafter, interchangeably recited with the term 'frequency band indicator'). This IE indicates the frequency band used in the cell. The IE is set to a value selected in the range from 1 to 64, and each value indicates the operating frequency bands specified in the LTE standard.

Table 1 shows the operating frequency bands of LTE specified in the LTE standard TS36.101. The leftmost column of Table 1 matches the value indicated by the IE, and the frequency bands corresponding to each indication value are shown in the right columns. The UE 100 determines a cell it camps on based on the frequency band information of the SIB1.

TABLE 1

| | Evolved-Universal Terrestrial Radio Access (E-UTRA) operating bands | | |
|---|---|---|---|
| E-UTRA Operating Band | Uplink (UL) operating band Base Station (BS) receive UE transmit $F_{UL\_low}-F_{UL\_high}$ | Downlink (DL) operating band BS transmit UE receive $F_{DL\_low}-F_{DL\_high}$ | Duplex Mode |
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |

TABLE 1-continued

Evolved-Universal Terrestrial Radio Access (E-UTRA) operating bands

| E-UTRA Operating Band | Uplink (UL) operating band Base Station (BS) receive UE transmit FUL_low-FUL_high | Downlink (DL) operating band BS transmit UE receive FDL_low-FDL_high | Duplex Mode |
|---|---|---|---|
| 5 | 824 MHz-849 MHz | 869 MHz-894 MHz | FDD |
| 61 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |

NOTE 1:
Band 6 is not applicable

If the UE 100 supports the operating frequency indicated in the frequencyBandIndicator IE and if the corresponding frequency band is authenticated, the UE 105 determines to camp on the corresponding cell at step 120. At this time, the E-UTRA Cell IDentifier (ID) and Tracking Area Code (TAC) acquired from the SIB1 is delivered to a higher layer of the UE 105.

Otherwise, if it is not possible to camp on the cell, the UE 105 performs the cell searching process again to discovery another cell. As a consequence, if a cell to camp on is found, the UE 105 receives SIB2 (hereinafter, interchangeably recited with the term 'second system information) from the eNB 105 at step 125.

The SIB2 includes a UL-CarrierFreq IE (hereinafter, interchangeably recited with the term 'uplink carrier frequency') and an additionalSpectrumEmission IE (hereinafter, interchangeably recited with the term 'additional spectrum emission'). The information included in SIB2 is at least one value used for calculating uplink center frequency and uplink transmission power.

The UE 100 calculates the uplink center frequency in the frequency band at step 130. The uplink center frequency is calculated by using Equation (1):

$$FUL = FUL\_low + 0.1(NUL - N_{offs\text{-}UL}) \qquad \text{Equation (1)}$$

In Equation (1), NUL denotes a UL-CarrierFreq IE value included in SIB2 and matches to an Absolute Radio Frequency Channel Number (ARFCN). The ARFCN is a value in the range from 0 to 65535 and is used to acquire the uplink and downlink center frequencies. FUL_low denotes the lowest uplink frequency of the selected frequency band, and NOffs-UL and FUL_low are defined in the LTE standard TS36.101.

Table 2 shows the NOffs-UL and FUL_low values applicable per operating frequency band. In order to calculate the center frequency in uplink, the operating frequency band should be known.

TABLE 2

E-UTRA channel numbers

| E-UTRA Operating Band | Downlink | | | Uplink | | |
|---|---|---|---|---|---|---|
| | FDL_low (MHz) | NOffs-DL | Range of NDL | FUL_low (MHz) | NOffs-UL | Range of NUL |
| 1 | 2110 | 0 | 0-599 | 1920 | 18000 | 18000-18599 |
| 2 | 1930 | 600 | 600-1199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |
| 8 | 925 | 3450 | 3450-3799 | 880 | 21450 | 21450-21799 |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4949 | 1427.9 | 22750 | 22750-22949 |
| 12 | 729 | 5010 | 5010-5179 | 699 | 23010 | 23010-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | | | | | | |
| 17 | 734 | 5730 | 5730-5849 | 704 | 23730 | 23730-23849 |
| 18 | 860 | 5850 | 5850-5999 | 815 | 23850 | 23850-23999 |
| 19 | 875 | 6000 | 6000-6149 | 830 | 24000 | 24000-24149 |
| 20 | 791 | 6150 | 6150-6449 | 832 | 24150 | 24150-24449 |
| 21 | 1495.9 | 6450 | 6450-6599 | 1447.9 | 24450 | 24450-24599 |
| 22 | 3510 | 6600 | 6600-7399 | 3410 | 24600 | 24600-25399 |
| 23 | 2180 | 7500 | 7500-7699 | 2000 | 25500 | 25500-25699 |

TABLE 2-continued

| | E-UTRA channel numbers | | | | | |
|---|---|---|---|---|---|---|
| E-UTRA | Downlink | | | Uplink | | |
| Operating Band | FDL_low (MHz) | NOffs-DL | Range of NDL | FUL_low (MHz) | NOffs-UL | Range of NUL |
| 24 | 1525 | 7700 | 7700-8039 | 1626.5 | 25700 | 25700-26039 |
| 25 | 1930 | 8040 | 8040-8689 | 1850 | 26040 | 26040-26689 |
| 26 | 859 | 8690 | 8690-9039 | 814 | 26690 | 26690-27039 |
| ... | | | | | | |
| 33 | 1900 | 36000 | 36000-36199 | 1900 | 36000 | 36000-36199 |
| 34 | 2010 | 36200 | 36200-36349 | 2010 | 36200 | 36200-36349 |
| 35 | 1850 | 36350 | 36350-36949 | 1850 | 36350 | 36350-36949 |
| 36 | 1930 | 36950 | 36950-37549 | 1930 | 36950 | 36950-37549 |
| 37 | 1910 | 37550 | 37550-37749 | 1910 | 37550 | 37550-37749 |
| 38 | 2570 | 37750 | 37750-38249 | 2570 | 37750 | 37750-38249 |
| 39 | 1880 | 38250 | 38250-38649 | 1880 | 38250 | 38250-38649 |
| 40 | 2300 | 38650 | 38650-39649 | 2300 | 38650 | 38650-39649 |
| 41 | 2496 | 39650 | 39650-41589 | 2496 | 39650 | 39650-41589 |
| 42 | 3400 | 41590 | 41590-43589 | 3400 | 41590 | 41590-43589 |
| 43 | 3600 | 43590 | 43590-45589 | 3600 | 43590 | 43590-45589 |

Next, the UE 100 calculates the uplink transmission power using the additionalSpectrumEmission IE at step 135. This IE is used to derive an Additional Maximum Power Reduction (A-MPR) value used for calculating uplink transmission power along with the operating frequency band. The relationship of A-MPR according to the additionSpectrumEmission IE is specified in the LTE standard TS36.101 as shown in Table 3.

TABLE 3

| | | A-MPR | | | |
|---|---|---|---|---|---|
| Network Signaling value | Requirements (sub-clause) | E-UTRA Band | Channel bandwidth (MHz) | Resources Blocks (NRB) | A-MPR (dB) |
| NS_01 | 6.6.2.1.1 | Table 5.5-1 | 1.4, 3, 5, 10, 15, 20 | Table 5.6-1 | NA |
| NS_03 | 6.6.2.2.1 | 2, 4, 10, 23, 25, 35, 36 | 3 | >5 | ≤1 |
| | | | 5 | >6 | ≤1 |
| | | | 10 | >6 | ≤1 |
| | | | 15 | >8 | ≤1 |
| | | | 20 | >10 | ≤1 |
| NS_04 | 6.6.2.2.2 | 41 | 5 | >6 | ≤1 |
| | | | 10, 15, 20 | See Table 6.2.4-4 | |
| NS_05 | 6.6.3.3.1 | 1 | 10, 15, 20 | ≥50 | ≤1 |
| N5_06 | 6.6.2.2.3 | 12, 13, 14, 17 | 1.4, 3, 5, 10 | Table 5.6-1 | n/a |
| NS_07 | 6.6.2.2.3 6.6.3.3.2 | 13 | 10 | Table 6.2.4-2 | Table 6.2.4-2 |
| NS_08 | 6.6.3.3.3 | 19 | 10, 15 | >44 | ≤3 |
| NS_09 | 6.6.3.3.4 | 21 | 10, 15 | >40 | ≤1 |
| | | | | >55 | ≤2 |
| NS_10 | | 20 | 15, 20 | Table 6.2.4-3 | Table 6.2.4-3 |
| NS_11 | 6.6.2.2.1 | 23¹ | 1.4, 3, 5, 10 | Table 6.2.4-5 | Table 6.2.4-5 |
| ... | | | | | |
| NS_32 | — | — | — | — | — |

Note 1:
Applies to the lower block of Band 23, i.e., a carrier placed in the 2000-2010 MHz region.

The leftmost column of Table 3 contains the NS values indicating additionSpectrumEmission IE values, e.g., if additionalSpectrumEmission is 1, this indicates NS_01 and, if 3, this indicates NS_03.

The maximum transmission power 1 of a certain serving cell c PCMAX,c is determined by Formula (2), and the highest value of the maximum transmission power 1 of the serving cell c PCMAX_H,c is determined by Equation (3), and the lowest value of the maximum transmission power 1 of the service cell c PCMAX_L,c is determined by Equation (4):

$$PCMAX\_L,c \leq PCMAX,c \leq PCMAX\_H,c \quad \text{Equation (2)}$$

$$PCMAX\_H,c = \text{MIN}\{PEMAX,c, PPowerClass\} \quad \text{Equation (3)}$$

$$PCMAX\_L,c = \text{MIN}\{PEMAX,c - TC,c, PCMAX\_H,c - MPRc - A\text{-}MPRc - TC,c\} \quad \text{Equation (4)}$$

where, PEMAX,c, ΔTC,c, PPowerClass, MPRc, and A-MPRc are specified in the 3GPP standard TS36.101.

PEMAX,c denotes a maximum allowed uplink transmission power in the service cell c which is transmitted from the eNB 105 to the UE 100. PPowerClass denotes the nominal maximum transmission power determined according to the physical characteristics of the UE 100. The power class of the UE 100 is determined at the manufacturing stage, and the UE 100 reports its power class to the network using a predetermined Radio Resource Control (RRC) message.

ΔTC,c, MPRc, AND A-MPRc are parameters for defining a value that is capable of adjusting the maximum transmission power of the UE 100 in the serving cell c to meet the unintended emission of interference to the neighbor channel. MPRc is a value determined according to the transmission amount (i.e., bandwidth) and modulation scheme. A-MPRc is a value determined according to the frequency band of uplink transmission, geographical characteristic, uplink transmission bandwidth, etc. A-MPRc is used for preparing the case where the frequency band is especially sensitive to the spurious emissions according to geographical characteristics and frequency band characteristics. In a case where the uplink transmission is performed at a boundary of the frequency band, ΔTC,c is used to allow for additional transmission power adjustment. If the uplink transmission is performed at a lowest 4 MHz or a highest 4 MHz of a certain frequency band, the UE 100 sets ΔTC,c to 1.5 DB, and otherwise, sets ΔTC,c to 0.

Referring back to FIG. 1, the UE 100 receives SIB5 at step 140. The SIB5 includes InterFreqCarrierFreqInfo IE (hereinafter, interchangeably recited with the term 'neighbor frequency information'). According to the number of neighbor E-UTRAs, multiple InterFreqCarrierFreqInfo IEs can be included. Each IE matches to a neighbor E-UTRA cell. This IE is used to derive the downlink center frequency of the neighbor E-UTRA cell to perform inter-frequency measurement.

The UE calculates the downlink center frequency of the neighbor E-UTRA cell to perform the inter-frequency measurement at step 145. The downlink center frequency of the neighbor E-UTRA cell is calculated according to Equation (5).

$$FUL = FDL\_low + 0.1(NDL - NOffs\text{-}DL) \qquad \text{Equation (5)}$$

where NDL denotes dl-CarrierFreq IE value included in the interFreqCarrierFreqInfo and matches to ARFCN. The FDL_low denotes the lowest downlink frequency of the selected frequency band. NOffs and FDL_low are defined in Table 2.

Afterward, the UE 100 performs normal operation at step 150. For example, the UE 100 is capable of performing one of cell reselection, paging message reception monitoring, system information change monitoring, RRC connection configuration, and data communication, as needed.

In LTE-A release 11, a new frequency band having an operating frequency overlapped with the operating frequency of the legacy frequency band. For example, band 26 in Table 1 is the frequency band newly added in Rel-11 and its operating frequency is overlapped with those indicated by legacy bands 5, 18, and 19.

Figure 2:
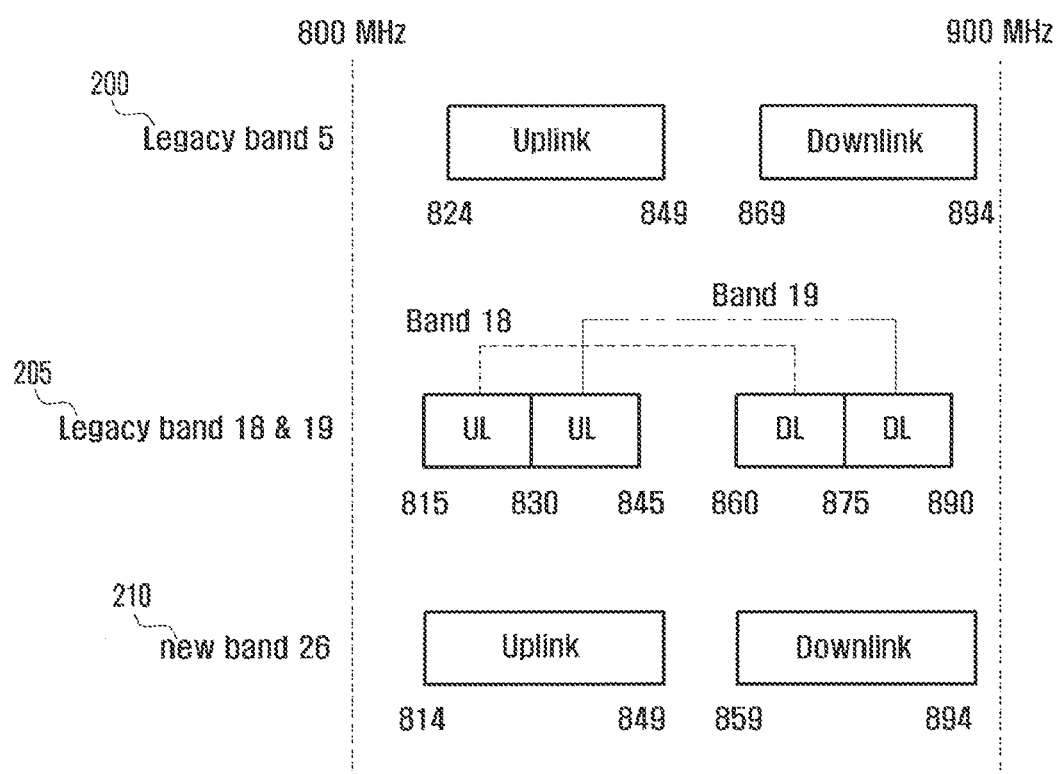
FIG. 2 is a diagram illustrating a configuration of frequency band of band 26 on which a legacy frequency band and a newly added frequency band are overlapped according to an exemplary embodiment of the present invention.

FIG. 2 is a diagram illustrating a configuration of frequency band of band 26 on which a legacy frequency band and a newly added frequency band are overlapped accordingly to an exemplary embodiment of the present invention.

Referring to FIG. 2, band 26 210 is composed of an uplink in the range of 814~849 MHz and a downlink in the range of 859~894 MHz. Meanwhile, legacy band 5 200 and legacy bands 18 and 19 205 exist in the range of 800~900 MHz so as to be overlapped with the frequency band of the newly added band 26 210. Although these frequency bands are used in different areas, it is desired for a roaming UE to support all of these overlapped frequencies. In the present exemplary embodiment, when a specific operating frequency belongs to multiple frequency bands, the eNB notifies that the multiple frequency bands are supportable. In this case, the eNB notifies of the legacy frequency bands in the legacy freqBandIndicator IE while the new frequency bands are notified in a newly defined IE. Unlike the legacy freqBandIndicator indicating only one frequency band, the newly defined IE is capable of indicating one or more frequency bands. In the present exemplary embodiment, this new IE is referred to as ExtfreqBandIndicator or MultiBand-InfoList (hereinafter, interchangeably recited with the term 'added frequency band indicator').

If there is at least one frequency band among the frequency bands indicated in the freqBandIndicator IE and the ExtfreqBandIndicator IE provided in a specific cell, the UE determines that the cell is accessible.

More particularly, when there are two or more frequency bands indicated in the ExtfreqBandIndicator, the UE selects one of the frequency bands according to a predetermined rule. If the UE supports multiple frequency bands, there can be UE-preferable priorities of frequency bands in view of the eNB or network. For example, if the eNB supports band X and band Y, the UE supporting both bands X and Y may prefer the band X to the band Y Accordingly, the UE and the eNB share a predetermined rule to indicate the priority implicitly for selecting one of plural frequency bands. For example, the eNB arranges the frequency bands in UE selection priority in the ExtfreqBandIndicator such that, if there are multiple UE-supportable frequency bands among the frequency bands indicated in the ExtfreqBandIndicator, the UE selects the supportable-frequency band arranged first among the supportable frequency bands.

Figure 3:
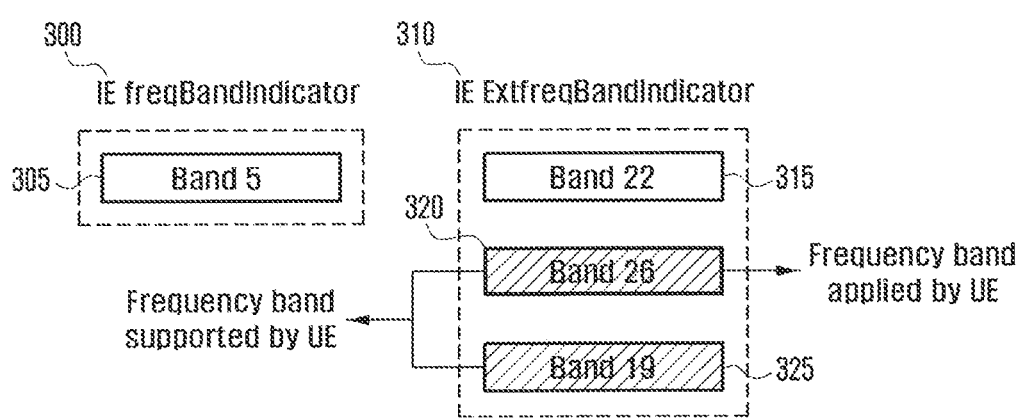
FIG. 3 is a signaling diagram illustrating a procedure for selecting one of frequency bands indicated by an ext-freqBandIndicator Information Element (IE) in a method according to an exemplary embodiment of the present invention.

FIG. 3 is a signaling diagram illustrating a procedure for selecting one of frequency bands indicated by an extfreqBandIndicator IE in a method according to an exemplary embodiment of the present invention. As described above, the extfreqBandIndicator IE is capable of including information on the multiple frequency bands.

Referring to FIG. 3, it is assumed that a freqBandIndicator 300 includes a band 5 305 as one of the legacy frequency bands and an extfreqBandIndicator 310 includes a plurality frequency bands of band 22 315, band 26 320, and band 19 325 filled in sequence. From the frequency band indicators, it is possible to know that the corresponding cell supports band 5, band 22, band 26, and band 19.

Assuming that two frequency bands of band 26 and band 19 are supported as indicated in the extfreqBandIndicator IE, the UE selects one of the two supportable frequency bands. According to an exemplary embodiment of the present invention, the frequency band included first in the extfreqBandIndicator IE is selected for use by the UE.

Although the UE selects a new frequency band, the uplink center frequency and the downlink center frequency of the neighbor E-UTRA cell are derived from the values indicated in the legacy freqBandIndicator IE and InterFreqCarrierFreqInfo IE. This is because there is no need to increase the signaling overhead unnecessarily by defining as many new IEs as the frequency bands supported by the cell, since each of the corresponding serving cell and the neighbor cell has one center frequency in each of uplink and downlink despite the serving cell supporting multiple frequency bands. The present exemplary embodiment also proposes a method for deriving the uplink center frequency using the Default distance specified in 3GPP standard TS36.101.

For the additionalSpectrumEmission IE broadcast in SIB2, a new IE is defined for the new frequency band. This IE is band-specific, and it is not possible to reuse the related-art value for the new band. In the present exemplary embodiment, the new IE is referred to as extAdditionalSpectrumEmission (hereinafter, interchangeably recited with the term 'extra additional spectrum emission'). The number of new IEs matches the number of new frequency bands supported by the cell. For example, if the cell supports two new frequency bands, a total of two extAdditionalSpectrumEmission IEs are generated for the respective bands. In a case where multiple extAdditionalSpectrumEmission IEs are configured for the respective frequency bands, these IEs match the frequency bands filled in the ExtfreqBandIndicator in sequence.

Figure 4:
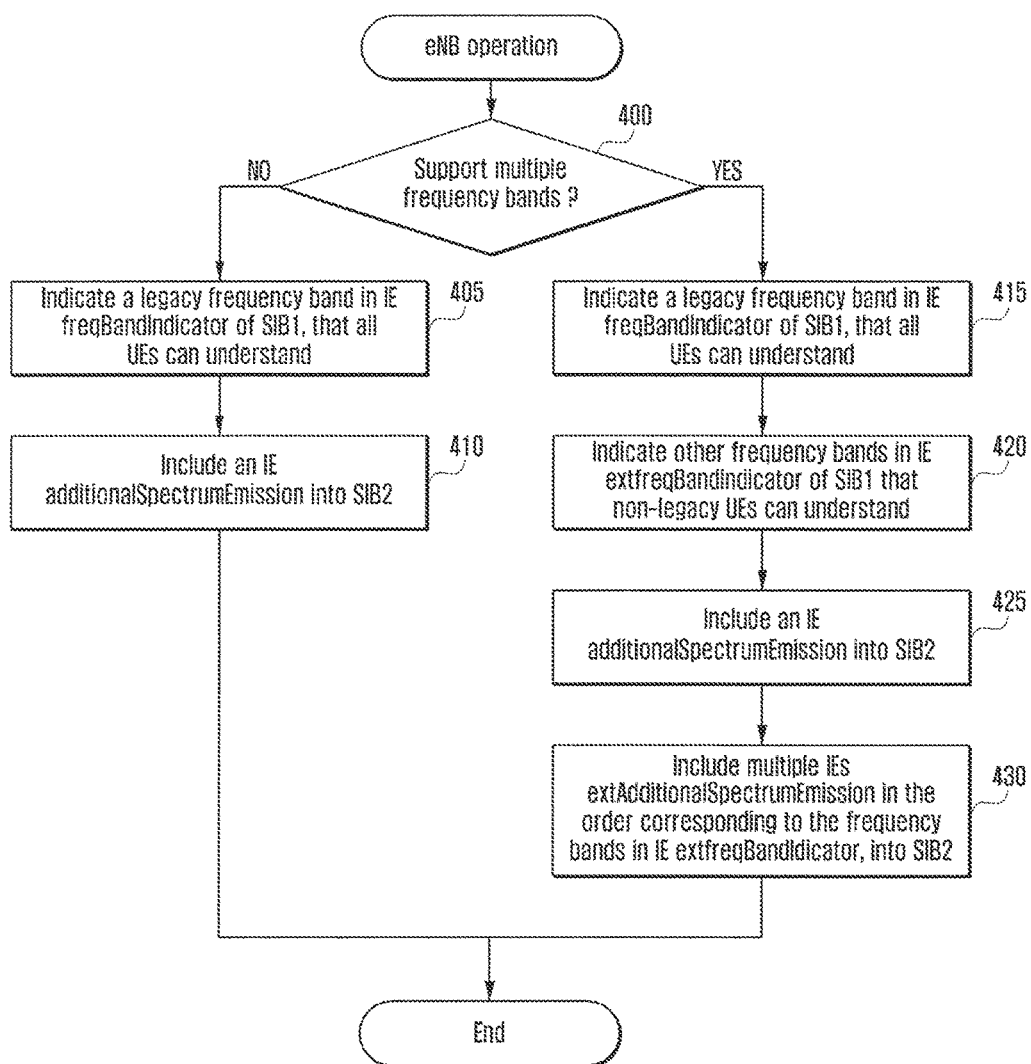
FIG. 4 is a flowchart illustrating the an evolved Node B (eNB) operation of a method according to an exemplary embodiment of the present invention.

FIG. 4 is a flowchart illustrating an eNB operation of a method according to an exemplary embodiment of the present invention.

FIG. 4 is directed to the eNB operation for filling the SIB1 and SIB2 with the multiple operating frequency bands and the extAdditionalSpectrumEmission IEs.

Referring to FIG. 4, the eNB determines whether it supports multiple operating frequency bands at step 400. If the eNB does not support multiple operating frequency bands, the eNB configures the freqBandIndicator IE of the SIB1, which all UEs can understand, to indicate a legacy frequency band as in the related-art method at step 405. The eNB includes the additionalSpectrumEmission value corresponding to the frequency band into the SIB2 at step 410. Afterward, the eNB broadcasts the generated SIBs (not shown).

Otherwise if the eNB supports multiple operating frequency bands, the eNB configures the freqBandIndicator IE of the SIB1, which all UEs can understand, to indicate a legacy frequency band at step 415. Next, the eNB configures an extfreqBandIndicator, which only the non-legacy UEs can understand, to indicate one or more frequency bands with the exception of the frequency band indicated by the freqBandIndicator IE at step 420.

The eNB includes the additionalSpectrumEmission value to be applied to the legacy frequency band indicated in the freqBandIndicator into the SIB2 at step 425. Next, the eNB includes the extAdditionalSpectrumEmission IE values corresponding to the frequency bands indicated in the extfreqBandIndicator IE into the SIB2 in the same sequence as the frequency bands included in the extfreqBandIndicator IE at step 430.

Afterward, the eNB broadcasts the generated SIBs (not shown).

Figure 5:
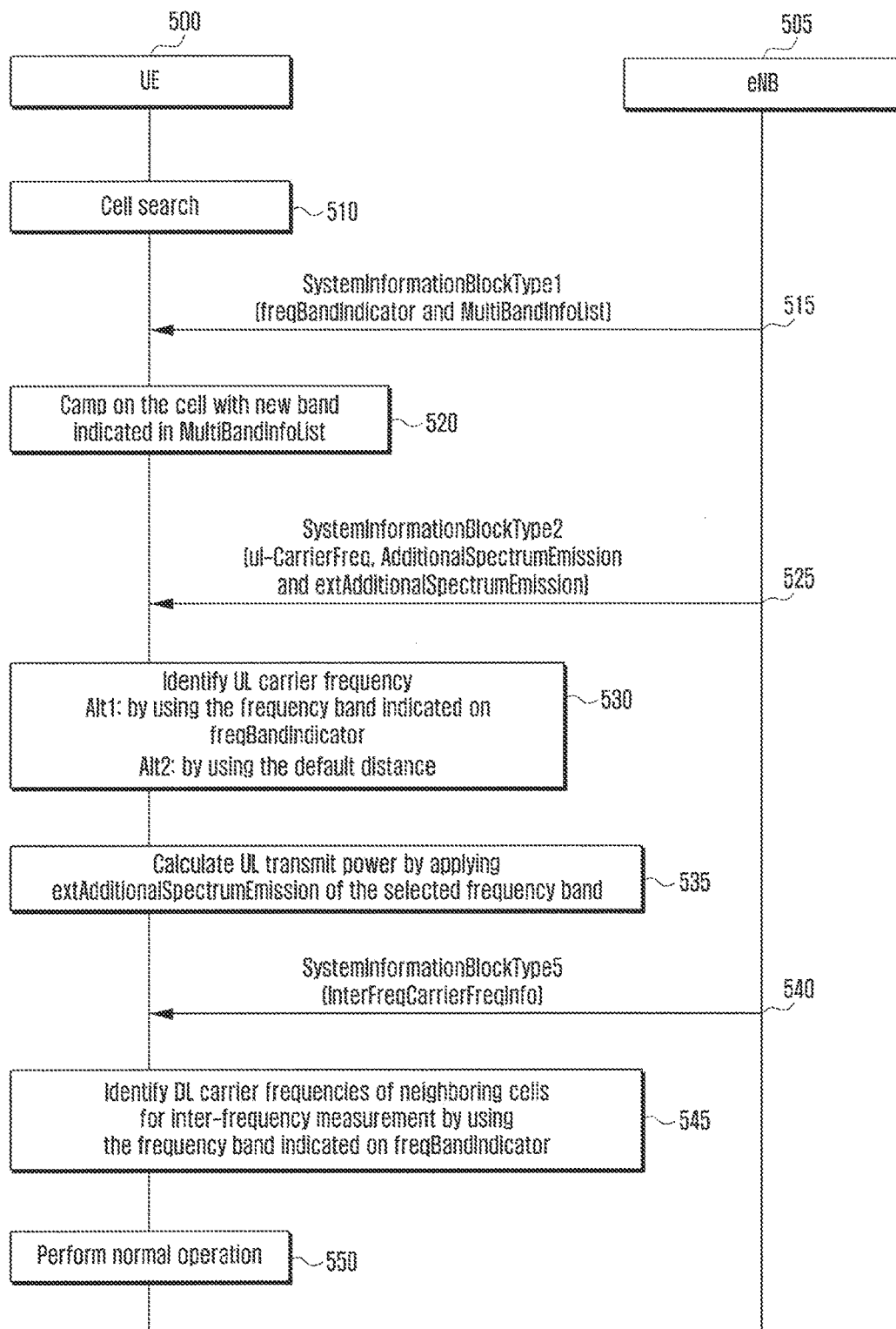
FIG. 5 is a flowchart illustrating eNB and UE operations of a method according to an exemplary embodiment of the present invention.

FIG. 5 is a flowchart illustrating eNB and UE operations of a method according to an exemplary embodiment of the present invention.

The UE 500 performs cell searching to discover a cell to which it camps on at step 510. If a cell having an appropriate signal strength is found, the UE 500 receives the SystemInformationBlockType1 (SIB1) broadcast by the eNB 505 of the corresponding cell at step 515.

In this case, the eNB 505 supports multiple frequency bands. Accordingly, the SIB1 received by the UE 500 includes both the freqBandIndicator and ExtfreqBandIndicator. These IEs indicate the frequency bands supported by the cells.

The UE 500 can be categorized into one of a legacy UE and a non-legacy UE. The legacy UE can decode and understand only the freqBandIndicator IE, and the non-legacy UE can decode and understand the ExtfreqBandIndicator IE as well as freqBandIndicator IE. Accordingly, the legacy UE determines whether it supports the frequency band indicated in the freqBandIndicator IE, and the non-legacy UE, if it supports at least one of the frequency bands indicated in the freqBandIndicator and ExtfreqBandIndicator IEs, determines that it is accessible to the cell.

If the UE 500 is accessible to a certain cell, this means that the access to the cell is not barred in view of the frequency band and thus the UE 500 takes a subsequent action continuously to determine whether the access to the cell is forbidden from another view point, e.g., inspecting the status of the corresponding cell using the cell ID and PLMN ID. If the UE 500 inspects the status of the cell, this case is described below.

That is, if there is no frequency band supported by the UE 500 among the frequency bands indicated in the IEs, the UE 500 determines that the access to the corresponding cell is barred. Otherwise, if there is two or more frequency bands supported by the UE 500 among the frequency bands indicated in the ExtfreqBandIndicator IE, the UE 500 selects the frequency band included first in the ExtfreqBandIndicator IE.

If the UE 500 supports a certain frequency band indicated in the ExtfreqBandIndicator IE and if the corresponding frequency band is authenticated, the UE 500 determines that it can access the corresponding cell in view of the frequency band at step 520. If the UE 500 supports the frequency band indicated in the freqBandIndicator IE, the UE 500 performs the procedure depicted in FIG. 1.

If the UE 500 determines that it cannot camp on the corresponding cell, the UE 500 performs the cell searching process again to discover another cell. If the UE 500 determines that it can access the corresponding cell in view of frequency band, the UE 500 checks the status of the cell by referencing the TAC and Cell ID of the corresponding cell. If the UE 500 checks the status of the cell, this means that the UE 500 determines whether the access to the cell is barred by the operator. Typically, the operation can bar a certain UE 500 from accessing the cells belonged to a specific Tracking Area (TA).

If a TA Update (TAU) reject message is received from a Mobility Management Entity (MME) in the TAU procedure, the UE 500 adds the "TA to the forbidden TAs for roaming" list in a TAU attempt according to a Evolved Packet System (EPS) Mobility Management (EMM) cause value included in the message so as to forbid the UE 500 to perform unnecessary access attempts. Accordingly, the UE 500 checks the status of the corresponding cell using a TAC of the cell of the frequency band it supports as above so as to determine whether the access to the corresponding cell is forbidden.

The UE 500 receives SIB2 from the eNB 505 at step 525. The SIB2 includes ul-CarrierFreq IE, additionalSpectrumEmission IE, and extAdditionalSpectrumEmission IE. These IEs are used for calculating uplink center frequency and uplink transmission power.

The UE 500 calculates the uplink center frequency of the frequency band at step 530. The present exemplary embodiment proposes two methods. The first is to calculate the uplink center frequency using Equation (1). In Equation (1), NUL denotes a UL-CarrierFreq IE value included in SIB2 and matches an ARFCN. FUL_low denotes the lowest uplink frequency of the selected frequency band, and NOffs-UL and FUL_low are defined in Table 2. The present exemplary embodiment is characterized in that, when retrieving NOffs-UL and FUL_low value in Table 2, an operating frequency band indicated in the freqBandIndicator IE is used other than the frequency band indicated in the ExtfreqBandIndicator IE.

If the UE 500 does not support the operating frequency band indicated in the freqBandIndicator IE, the UE 500 may not understand the ARFCN provided in the SIB2. In this case, the first method is not applicable. The second method derives the uplink center frequency by applying the default distance to the frequency band. The default distance is the frequency offset value between the center frequencies of the transmission and reception carriers per band and specified in the 3GPP standard TS36.101. Table 4 shows the details of the default distance specified in the TS36.101. For example, if the UE 500 uses band 26, the uplink center frequency is the value obtained by subtracting 45 MHz from the downlink center frequency. If a new frequency band is introduced afterward, the default distance for the new frequency band will be specified in a technical specification of the standard.

TABLE 4

Default UE TX-RX frequency separation

| E-UTRA Operating Band | TX-RX carrier center frequency separation |
|---|---|
| 1 | 190 MHz |
| 2 | 80 MHz |
| 3 | 95 MHz |
| 4 | 400 MHz |
| 5 | 45 MHz |
| 6 | 45 MHz |
| 7 | 120 MHz |
| 8 | 45 MHz |
| 9 | 95 MHz |
| 10 | 400 MHz |
| 11 | 48 MHz |
| 12 | 30 MHz |
| 13 | −31 MHz |
| 14 | −30 MHz |
| 17 | 30 MHz |
| 18 | 45 MHz |
| 19 | 45 MHz |
| 20 | −41 MHz |
| 21 | 48 MHz |
| 22 | 100 MHz |
| 23 | 180 MHz |
| 24 | −101.5 MHz |
| 25 | 80 MHz |
| 26 | 45 MHz |

Typically, it is a basic requirement that the downlink center frequency and uplink center frequency of a cell belongs to the same frequency band, and the distance between the downlink and uplink center frequencies may change depending on the cell. In order to support such a case, the eNB 505 broadcasts an ARFCN indicating the uplink center frequency. However, it may not be supported to configure the distance between the downlink and uplink center frequencies flexibly, but the default distance is applied to all cells. Accordingly, when the default distance is applied to a certain cell supporting multiple frequency bands, then eNB 505 signals only one ARFCN indicating the uplink center frequency and, if there is only one ARFCN indicating uplink center frequency, the UE 500 calculates the uplink center frequency using the ARFCN (when the UE 500 has selected the frequency band indicated by freqBandIndicator) or by applying the default distance (when the UE 500 has selected the frequency band indicated by ExtfreqBandIndicator). If the default distance is not applied to a certain cell supporting multiple frequency bands, the eNB 505 signals the ARFCN indicating the uplink center frequency per frequency band separately. Accordingly, the operation of the UE selected the frequency band indicated by the ExtfreqBandIndicator can be defined as follows.

If only one ARFCN indicating the uplink center frequency is signaled in the system information, the uplink center frequency is calculated by applying the default distance.

If multiple ARFCNs indicating uplink center frequencies are signaled in the system information, the uplink center frequency is calculated by applying the uplink ARFCN corresponding to the frequency band that has been selected.

The system information also includes the information on the uplink bandwidth. The number of uplink bandwidth information is always only one, and the UE 500 determines the uplink transmission resource in the corresponding cell by applying the only one uplink bandwidth information regardless whether the selected frequency band is the one indicated by the freqBandIndicator or the ExtfreqBandIndicator.

In another method, if one ARFCN indicating the uplink center frequency is signaled and if the frequency band indicated by the ExtfreqBandIndicator is selected, the UE 500 is capable of determining the uplink center frequency by applying the following rule.

If the UE 500 can understand the frequency band indicated by the freqBandIndicator and the ARFCN indicating the uplink center frequency, the UE 500 determines the uplink center frequency by applying the frequency band indicated by the freqBandIndicator and the ARFCN indicating the uplink center frequency despite the UE 500 having selected the frequency band indicated by the ExtfreqBandIndicator.

If the UE 500 cannot understand the frequency band indicated by the freqBandIndicator and the ARFCN indicating the uplink center frequency, the UE 500 calculates the uplink center frequency by applying the downlink center frequency of the current cell determined in the cell search process and the default distance of the frequency band selected in the ExtfreqBandIndicator. That is, the UE 500 calculates the uplink center frequency by subtracting the default distance defined for the selected frequency band from the downlink center frequency of the cell. For reference, if the uplink center frequency is calculated by applying the default distance, this means that the UE 500 determines the value obtained by subtracting the default distance defined for the UE-selected frequency band from the downlink center frequency recognized in the cell search process as the uplink center frequency throughout the present disclosure.

The UE 500 calculates the uplink transmission power using the extadditionalSpectrumEmission IE at step 535. When multiple extAdditionalSpectrumEmission IEs corresponding to the respective frequency bands exist, the UE 500 uses the extadditionalSpectrumEmission IE values corresponding to the frequency bands included in the ExtfreqBandIndicator in sequence. This IE is also used to derive A-MPR value used for calculating uplink transmission power value along with the operating frequency band. The relationship between the Additional-Maximum Power Reduction (A-MPR) and uplink transmission power value has been described above.

Next, the UE 500 receives SIB5 at step 540. The SIB5 includes InterFreqCarrierFreqInfo IE. The number of InterFreqCarrierFreqInfo IEs can configured as many as the number of neighbor E-UTRA cells. Each IE matches to a neighbor E-UTRA cell. This IE is used to derive the downlink center frequency of the neighbor E-UTRA cell to perform inter-frequency measurement.

The UE 500 calculates the downlink center frequency of the neighbor E-UTRA cell to perform inter-frequency measurement at step 545. The downlink center frequency of the neighbor E-UTRA cell is calculated according to Equation (5). In Equation (5), NDL denotes dl-CarrierFreq IE value included in the interFreqCarrierFreqInfo and matches to ARFCN. The FDL_low denotes the lowest downlink frequency of the selected frequency band. NOffs and FDL_low are defined in Table 2. The present exemplary embodiment is characterized in that, when retrieving NOffs-UL and FUL_low value in Table 2, an operating frequency band indicated in the freqBandIndicator IE is applied other than the frequency band indicated in the ExtfreqBandIndicator IE.

Afterward, the UE 500 starts normal operation at step 550. For example, the UE 500 is capable of performing one of the cell reselection, paging message reception monitoring, system information change monitoring, RRC connection configuration, and data communication, as needed.

Among the above-enumerated normal operations, the present exemplary embodiment proposes the cell reselection operation. That is, the present exemplary embodiment proposes the UE 500 operation for determining whether to take the E-UTRA frequencies configured with multiple frequency bands into consideration in SIB5.

The SIB5 is capable of including one or more E-UTRA frequency-related information and broadcast neighbor frequency information. The SIB5 includes the following information per E-UTRA frequency that is applied in cell reselection to the corresponding E-UTRAN frequency.

dl-CarrierFreq=ARFCN–ValueEUTRA q-RxLevMin, p-Max, t-ReselectionEUTRA, threshX-High, threshX-Low, cellReselectionPriority, etc., list of Frequency Bands (FBs) to which E-UTRAN frequencies, with the exception of the frequency band mapped to dl-CarrierFreq, belongs (hereinafter, additional FB list)

The UE 500 operates as follows in performing the inter-frequency cell reselection to the frequency 1 as a certain E-UTRA frequency.

1) If the cell reselection priority of frequency 1 is higher than that of a current serving frequency, the UE 500 supports the frequency band mapped to dl-CarrierFreq of frequency 1. Otherwise, if the UE 500 does not support the frequency band, the UE 500 supports one of the frequency bands included in the additional FB list, and if the channel quality of the best cell among the cells belonging to the frequency 1 is equal to or higher than a predetermined threshold (threshX-High) and if the best cell is not access-barred, the UE 500 reselects the cell.

2) If the cell reselection priority of frequency 1 is lower than that of a current serving frequency, the UE 500 supports the frequency band mapped to dl-CarrierFreq of the frequency 1. Otherwise, if the UE 500 does not support the frequency band, the UE 500 supports one of the frequency bands included in the additional FB list. Also, if the channel quality of the best cell on the current serving frequency is equal to or less then threshX-Low, if the channel quality of the best cell among the cells belonged to frequency 1 is equal to or higher a than a predetermined threshold, and if the cell is not in access-barred state, the UE 500 selects the best cell.

Figure 6:
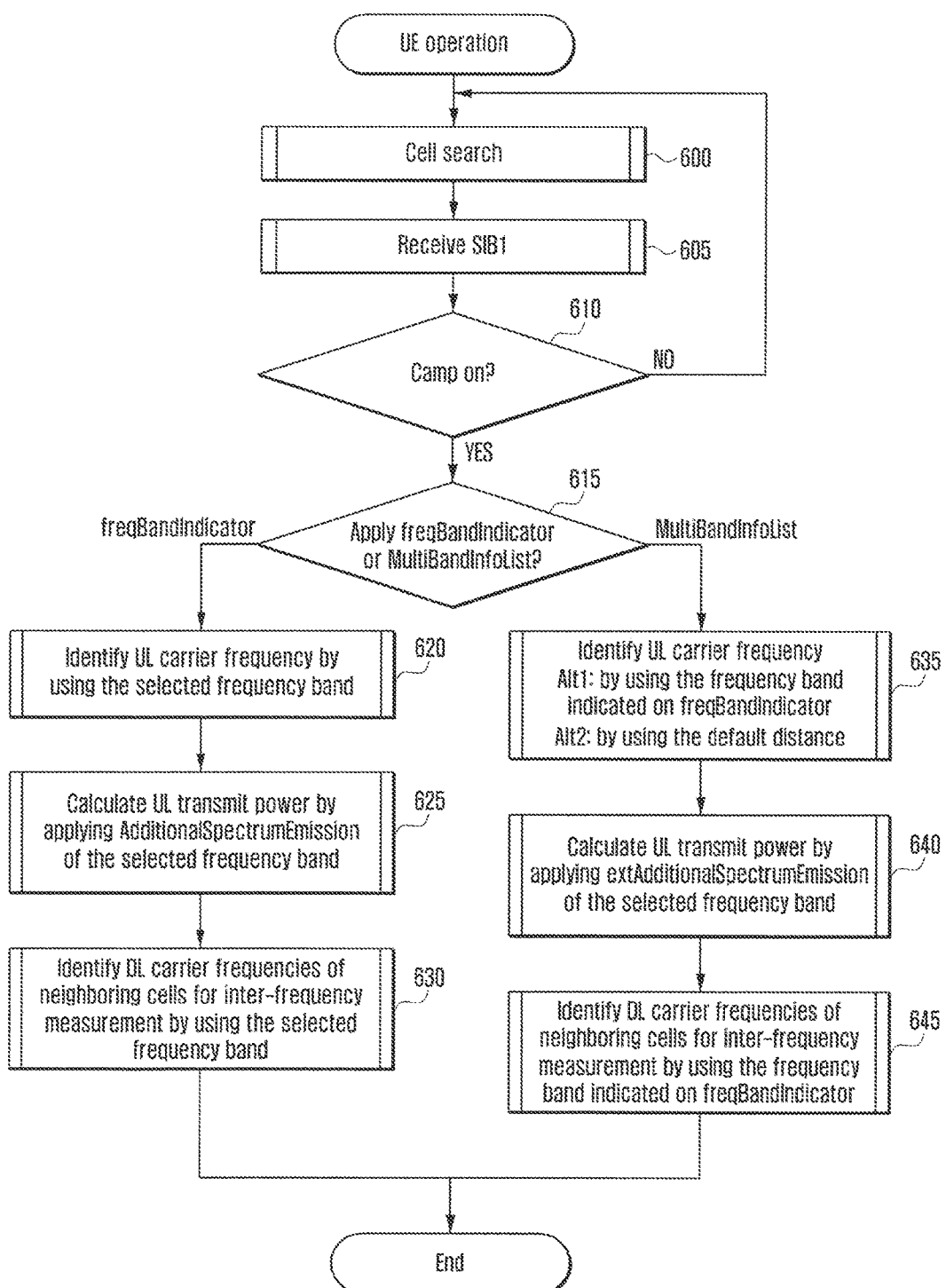
FIG. 6 is a flowchart illustrating a UE operation of a method according to an exemplary embodiment of the present invention.

FIG. 6 is a flowchart illustrating a UE operation of a method according to an exemplary embodiment of the present invention.

The UE performs cell searching to discover a cell to camp on at step 600. If a cell having an appropriate signal strength is found, the UE receives SIB1 broadcast by the eNB corresponding to the cell at step 605.

The UE checks the received SIB1 to determine whether the frequency band indicated by the freqBandIndicator or ExtfreqBandIndicator IEs included in the SIB1 is a supportable frequency band and whether the corresponding frequency band is capable of being authenticated for camp-on at step 610.

If it is determined not to camp on the cell, the UE returns the procedure to step 600 to perform the cell searching process again to discover another cell.

Otherwise, if it is determined to camp on the cell, the UE selects one of the frequency bands indicated by the freqBandIndicator IE or ExtfreqBandIndicator IE at step 615. At this time, since the legacy UE can only decode the freqBandIndicator IE, the procedure goes to step 620. Meanwhile, the non-legacy UE is capable of decoding both the freqBandIndicator and ExtfreqBandIndicator IEs. If the frequency band indicated in the ExtfreqBandIndicato IE is selected, the procedure goes to step 635.

At step 620, the UE calculates the uplink center frequency according to Equation (1). In the calculation, the NOffs-UL and FUL-low derived by applying the operating frequency band indicated by ul-CarrierFreq IE and freqBandIndicator included in the SIB2 are used.

The UE calculates the uplink transmission power using additionalSpectrumEmissioin IE included in the SIB2 at step 625. According to an exemplary embodiment of the present invention, when multiple extAdditionalSpectrumEmission IEs corresponding to multiple frequency bands are included, the uplink transmission power is calculated using the extadditionalSpectrumEmission IEs corresponding in sequence to the applied frequency bands among the frequency bands included in the ExtfreqBandIndicato IE.

The UE calculates the downlink center frequency of the neighbor E-UTRA cell at step 630. In the calculation, the NOffs-UL and FUL_low derived by applying the operating frequency band indicated by the dl-CarrierFreq IE and freqBandIndicator IE of the interFreqCarrierFreqInfo included in the SIB5 are used.

At step 635, the UE calculates the uplink center frequency. The present exemplary embodiment proposes two methods. The first method is to calculate the uplink center frequency according to Equation (1). In the calculation, the NOffs-UL and FUL_low derived by applying the operating frequency band indicated by the ul-CarrierFreq IE and freqBandIndicator IE included in the SIB2 are used. The second method is to calculate the uplink center frequency by applying the default distance to the corresponding frequency band.

The UE calculates the uplink transmission power using the extadditionalSpectrumEmission IE included in the SIB2 at step 640. Next, the UE calculates the downlink center frequency of the neighbor E-UTRA cell using Equation (5) at step 645. In the calculation, the NOffs-UL and FUL_low derived by applying the operating frequency band indicated by the dl-CarrierFreq IE and freqBandIndicator IE of the interFreqCarrierFreqInfo included in the SIB5 are used.

Figure 7:
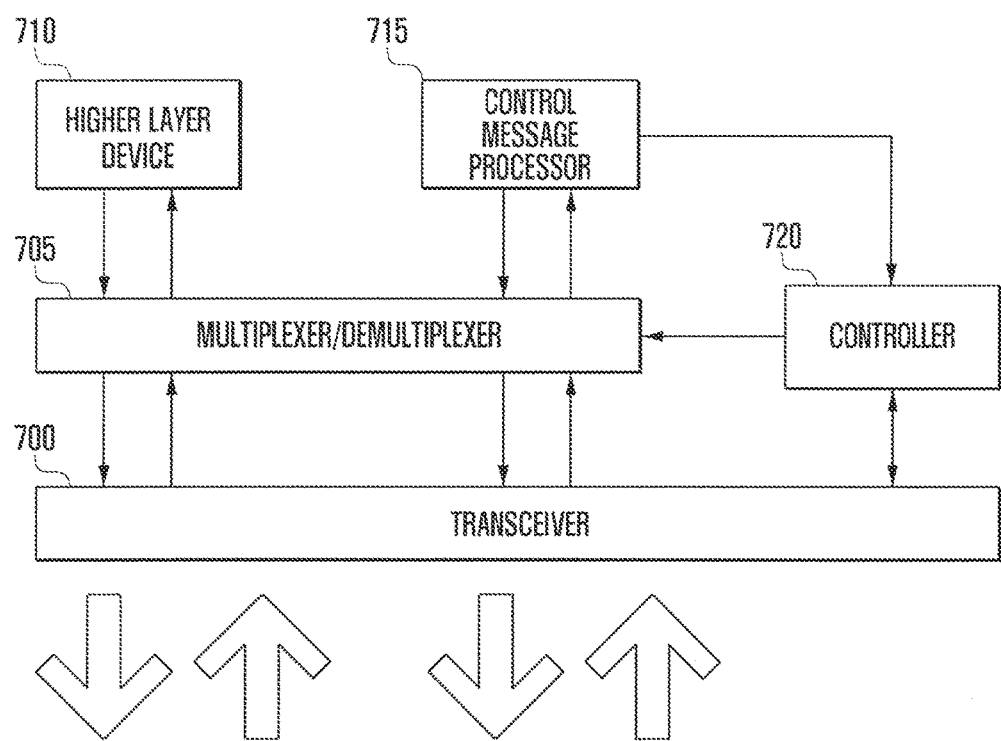
FIG. 7 is a block diagram illustrating a configuration of a UE according to an exemplary embodiment of the present invention.

FIG. 7 is a block diagram illustrating a configuration of a UE according to an exemplary embodiment of the present invention.

The UE includes higher layer device 710 for processing data and a control message processor 715 for processing control messages. The UE multiplexes the transmission data and control signals by means of the multiplexer 705 and transmits the multiplexed signals through the transceiver 700 under the control of the controller 720. The UE also demultiplexes the signal received through the transceiver 700 and delivers the demultiplexed signal to the higher layer device 710 or the control message processor 715 according to the message information.

In more detail, the controller 720 controls the UE to receive the first system information including a frequency band indicator indicating a frequency band supported by the eNB and an additional frequency band indicator indicating one or more frequency bands supported by the eNB. The controller 720 determines whether there is at least one supportable frequency band among the frequency bands indicated by the frequency band indicator and the additional frequency band indicators. If there is at least one supportable frequency band, the controller 720 controls the UE to attempt access to the eNB.

According to an exemplary embodiment of the present invention, if there are two or more supportably frequency bands among the frequency bands indicated by the additional frequency band indicators, the controller 720 is capable of controlling the UE to select the frequency band indicated by the first included frequency band indicator as the frequency band to access.

The controller 720 is capable of controlling the UE to receive the second system information including an additional spectrum emission value corresponding to the frequency band indicated by the frequency band indicator and at least one extra additional spectrum emission value corresponding to at least one frequency bands.

In this case, the at least one extra additional spectrum emission value corresponds to the frequency bands supported by the eNB in sequence according to the additional frequency band indicator.

The controller 720 calculates the uplink transmission power based on the spectrum emission value corresponding to the frequency band to which the UE attempts access.

Meanwhile, the second system information is capable of further including uplink carrier frequency information and, in this case, the controller 720 calculates the uplink center frequency based on the uplink carrier frequency information.

Figure 8:
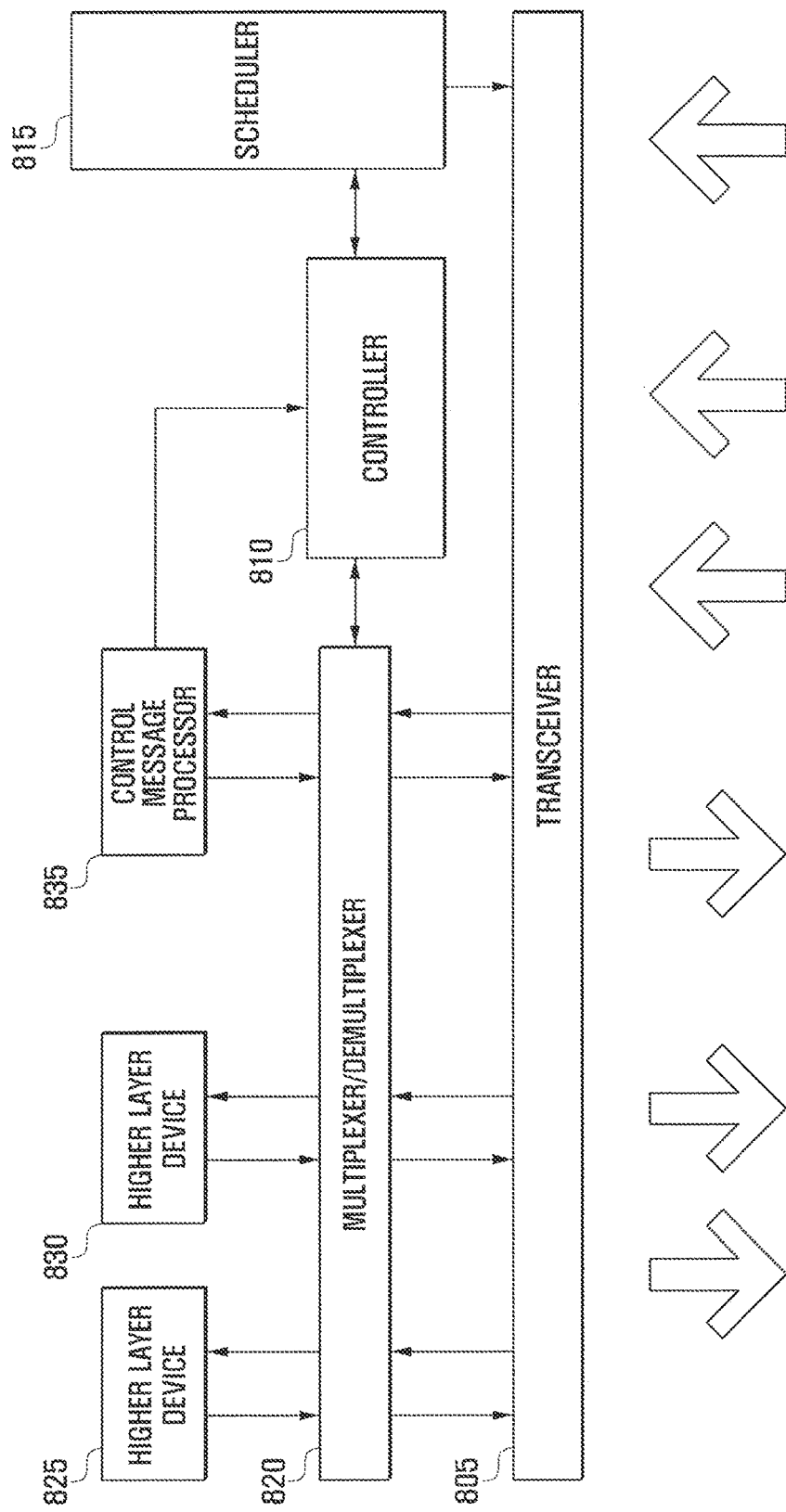
FIG. 8 is a block diagram illustrating a configuration of an eNB according to an exemplary embodiment of the present invention.

FIG. 8 is a block diagram illustrating a configuration of an eNB according to an exemplary embodiment of the present invention. Referring to FIG. 8, the eNB includes a transceiver 805, a controller 810, a multiplexer/demultiplexer 820, a control message processor 835, a plurality of higher layer processors 825 and 830, and a scheduler 815.

The transceiver 805 transmits data and control signals on the downlink carrier and receives data and control signals on the uplink carrier. In a case where multiple carriers are configured, the transceiver 805 transmits/receive data and controls signals on the multiple carriers.

The multiplexer/demultiplexer 820 multiplexes the data generated by the higher layer devices 825 and 830 and the control message processor 835 and demultiplexes the data received by the transceiver 805 and delivers the demultiplexed data to the appropriate higher layer processors 825 and 830, the control message processor 835, and the controller 810. The control unit 810 determines whether to additionally include ExtfrequencyBandIndicator IE in the SIB1 and whether to additionally include extadditionalSpectrumEmission IE in the SIB2 depending on whether the eNB support multiple frequency bands.

The control message processor 835 generates SIB1 and SIB2 to the lower layer according to the instruction of the controller 810.

The higher layer devices 825 and 830 are capable of being activated per UE per service to process and deliver a user service such as File Transfer Protocol (FTP) and Voice over Internet Protocol (VoIP) to the multiplexer/demultiplexer and process and deliver the data from the multiplexer/demultiplexer 820 to the service application on the higher layer.

The scheduler 815 allocates transmission resources to the UE at predetermined timing in consideration of the UE's buffer state, channel condition, and UE's Active Time; and controls the transceiver to process the signal transmitted by or to be transmitted to the UE.

In more detail, the controller 810 controls the eNB to generates the first system information including the frequency band indicator indicating a frequency band supported by the eNB and an additional frequency band indicator indicating at least one frequency band supported by the eNB. The controller 810 controls the eNB to broadcast the first system information.

The control unit 810 controls the eNB to generate the second system information including an additional spectrum emission value corresponding to the frequency band indicated by the frequency band indicator and at least one extra additional spectrum emission value corresponding to at least one frequency band indicated by the additional frequency band indicators. The controller 810 also controls the eNB to broadcast the second system information.

The above-described exemplary embodiments of the present invention can be summarized in that the eNB broadcasts a frequency band through a first FB-related information element and at least one frequency band through a second FB-related information element. The UE checks the frequency bands indicated by the first and second FB-related IEs to determine whether there is at least one supportable band and, if so, that the cell is accessible.

The eNB broadcasts an AdditionalSpectrumEmission information through the first additional emission-related IE and at least one AdditionalSpectrumEmission information through the second additional emission-related IE. The AdditionalSpectrumEmission of the first additional emission-related IE corresponds to the frequency band of the first IE, and the AdditionalSpectrumEmission of the second additional emission-related IE corresponds to the frequency band of the second IE.

The UE uses the AdditionalSpectrumEmission corresponding to the selected band to determine the uplink transmission power.

If one or more frequency bands are supported, the UE selects a frequency band according to a predetermined rule. The rule can be to select the FB filled first among the FBs included in the second IE.

According to another exemplary embodiment of the present invention, if the FB indicated in the first FB-related IE is selected, the UE determines the uplink center frequency using ARFCN information and, if the FB indicated by the first FB-related IE is not selected, determines the uplink center frequency by applying a default distance.

If the FB indicated by the first FB-related IE is not selected (or if the FB indicated by the second FB-related IE), the UE determines the uplink center frequency using the UL ARFCN information of the legacy IE and configures the uplink transmission power by applying Additional Spectrum Emission of the second additional emission-related IE.

As described above, the method and apparatus for supporting multiple frequency bands according to exemplary embodiments of the present invention are capable of supporting multiple frequency bands efficiently in an LTE-A Release-11 system to which new frequency bands are added as overlapping with the legacy frequency band.

While the invention has been shown and described in detail with reference to certain exemplary embodiments thereof, it will be understood by those skilled in the art that various changes in form and details may be made therein without departing from the spirit and scope of the present invention as defined in the appended claims and their equivalents.

What is claimed is:

1. A method for supporting multiple frequency bands by a base station in a wireless communication system, the method comprising:
   generating first system information including first information indicating a first frequency band supported by a cell and a list of at least one second information indicating at least one second frequency band supported by the cell;
   transmitting the first system information to a terminal;
   generating second system information including uplink frequency information, first spectrum emission information corresponding to the first information and a list of at least one second spectrum emission information corresponding to the at least one second information; and
   transmitting the second system information to the terminal,
   wherein an uplink frequency offset and a lower limit of an uplink frequency are determined based on the first information if the first frequency band is not supported and the at least one second frequency band is supported by the terminal, and
   wherein the uplink frequency offset and the lower limit of the uplink frequency are used for identifying an uplink carrier frequency.

2. The method of claim 1, wherein the uplink carrier frequency is identified based on the uplink frequency information included in the second system information, the uplink frequency offset and the lower limit of the uplink carrier frequency.

3. The method of claim 1, wherein the at least one second spectrum emission information of the second system information is listed in a same order of the at least one second information supported by the cell based on the first system information.

4. A base station supporting a plurality of frequency bands in a wireless communication system, the base station comprising:
   a transceiver; and
   a controller coupled with the transceiver and configured to:
      generate first system information including first information indicating a first frequency band supported by a cell and a list of at least one second information indicating at least one second frequency band supported by the cell,
      transmit the first system information to a terminal,
      generate second system information including uplink frequency information, first spectrum emission information corresponding to the first information and a list of at least one second spectrum emission information corresponding to the at least one second information, and
      transmit the second system information to the terminal,
   wherein an uplink frequency offset and a lower limit of an uplink frequency are determined based on the first information if the first frequency band is not supported and the at least one second frequency band is supported by the terminal, and
   wherein the uplink frequency offset and the lower limit of the uplink frequency are used for identifying an uplink carrier frequency.

5. The base station of claim 4, wherein the uplink carrier frequency is identified based on the uplink frequency information included in the second system information, the uplink frequency offset and the lower limit of the uplink carrier frequency.

6. The base station of claim 4, wherein the at least one second spectrum emission information of the second system information is listed in a same order of the at least one second information supported by the cell based on the first system information.

7. A method for supporting multiple frequency bands by a terminal in a wireless communication system, the method comprising:
   receiving, from a base station, first system information including first information indicating a first frequency band supported by a cell and a list of at least one second information indicating at least one second frequency band supported by the cell;
   receiving, from the base station, second system information including uplink frequency information, first spectrum emission information corresponding to the first information and a list of at least one second spectrum emission information corresponding to the at least one second information; and
   applying a frequency band, indicated by first listed information supported by the terminal from the list of the at least one second information, to access the cell if the first frequency band is not supported by the terminal,
   wherein an uplink frequency offset and a lower limit of an uplink frequency are determined based on the first information if the first frequency band is not supported and the at least one second frequency band is supported by the terminal, and
   wherein the uplink frequency offset and the lower limit of the uplink frequency are used for identifying an uplink carrier frequency.

8. The method of claim 7, further comprising:
   selecting, if the at least one second information indicated by the first system information includes multiple frequency bands supported by the terminal, a frequency band indicated first among the multiple frequency bands supported by the terminal as the frequency band to access.

9. The method of claim 7, further comprising:
   determining uplink (UL) transmission power according to the second spectrum emission information corresponding to the at least one second information on which the terminal determines to access.

10. The method of claim 7, wherein the uplink carrier frequency is identified based on the uplink frequency information included in the second system information, the uplink frequency offset and the lower limit of the uplink carrier frequency.

11. The method of claim 7, wherein the at least one second spectrum emission information of the second system information is listed in a same order of the at least one second information supported by the cell based on the first system information.

12. The method of claim 7, further comprising:
   determining whether the at least one second information indicated by the first system information includes one or more frequency bands supported by the terminal.

13. The method of claim 7, wherein the access is attempted if the first information or the at least one second information indicated by the first system information includes the one or more frequency bands supported by the terminal.

14. A terminal for supporting a plurality of frequency bands in a wireless communication system, the terminal comprising:
a transceiver; and
a controller coupled with the transceiver and configured to:
receive, from a base station, first system information including first information indicating a first frequency band supported by a cell and a list of at least one second information indicating at least one second frequency band supported by the cell,
receive, from the base station, second system information including uplink frequency information, first spectrum emission information corresponding to the first information and a list of at least one second spectrum emission information corresponding to the at least one second information, and
apply a frequency band, indicated by first listed information supported by the terminal from the list of the at least one second information, to access the cell if the first frequency band is not supported by the terminal,
wherein an uplink frequency offset and a lower limit of an uplink frequency are determined based on the first information if the first frequency band is not supported and the at least one second frequency band is supported by the terminal, and
wherein the uplink frequency offset and the lower limit of the uplink frequency are used for identifying an uplink carrier frequency.

15. The terminal of claim 14, wherein the controller is further configured to select, if the at least one second information indicated by the first system information includes multiple frequency bands supported by the terminal, a frequency band indicated first among the multiple frequency bands supported by the terminal as the frequency band to access.

16. The terminal of claim 14, wherein the controller is further configured to determine uplink (UL) transmission power according to the second spectrum emission information corresponding to the at least one second information on which the terminal determines to access.

17. The terminal of claim 14, wherein the uplink carrier frequency is identified based on the uplink frequency information included in the second system information, the uplink frequency offset and the lower limit of the uplink carrier frequency.

18. The terminal of claim 14, wherein the at least one second spectrum emission information of the second system information is listed in a same order of the at least one second information supported by the cell based on the first system information.

19. The terminal of claim 14, wherein the access is attempted if the first information or the at least one second information indicated by the first system information includes the one or more frequency bands supported by the terminal.

20. The terminal of claim 14, wherein the controller is further configured to determine whether the at least one second information indicated by the first system information includes one or more frequency bands supported by the terminal.

* * * * *